(12) United States Patent
Potts

(10) Patent No.: US 8,834,727 B2
(45) Date of Patent: *Sep. 16, 2014

(54) PRESSURIZED GAS LIFTING AND GAS REJUVENATION

(71) Applicant: David A. Potts, Killingworth, CT (US)

(72) Inventor: David A. Potts, Killingworth, CT (US)

(*) Notice: Subject to any disclaimer, the term of this patent is extended or adjusted under 35 U.S.C. 154(b) by 0 days.

This patent is subject to a terminal disclaimer.

(21) Appl. No.: 13/939,857

(22) Filed: Jul. 11, 2013

(65) Prior Publication Data

US 2013/0306572 A1 Nov. 21, 2013

Related U.S. Application Data

(63) Continuation-in-part of application No. 13/836,061, filed on Mar. 15, 2013.

(60) Provisional application No. 61/647,634, filed on May 16, 2012.

(51) Int. Cl.
*C02F 1/00* (2006.01)
*C02F 3/00* (2006.01)
*C02F 3/12* (2006.01)
*C02F 1/74* (2006.01)

(52) U.S. Cl.
CPC . *C02F 1/00* (2013.01); *C02F 1/001* (2013.01); *C02F 3/1242* (2013.01); *C02F 2209/08* (2013.01); *C02F 2209/03* (2013.01); *C02F 2209/005* (2013.01); *C02F 2209/06* (2013.01); *C02F 2209/02* (2013.01); *C02F 1/74* (2013.01); *C02F 2209/22* (2013.01); *C02F 3/006* (2013.01); *C02F 1/006* (2013.01)
USPC ............ 210/747.1; 210/103; 210/170.08; 210/109; 210/117; 210/258; 210/532.2; 417/118

(58) Field of Classification Search
None
See application file for complete search history.

(56) References Cited

U.S. PATENT DOCUMENTS

| 2,300,039 | A | * | 10/1942 | Yeomans et al. | 417/120 |
|---|---|---|---|---|---|
| 3,332,552 | A | * | 7/1967 | Zabel | 210/86 |
| 3,679,053 | A | | 7/1972 | Koulovatos et al. | |
| 4,025,237 | A | * | 5/1977 | French | 417/131 |
| 4,059,524 | A | | 11/1977 | Chataigner et al. | |
| 4,083,661 | A | * | 4/1978 | McPherson et al. | 417/131 |
| 4,303,350 | A | * | 12/1981 | Dix | 405/36 |
| 5,492,635 | A | * | 2/1996 | Ball | 210/802 |

(Continued)

FOREIGN PATENT DOCUMENTS

CA 2361723 8/2006

OTHER PUBLICATIONS

International Search Report and Written Opinion of the International Searching Authority in PCT Application PCT/US2013/040727 dated Aug. 12, 2013.

(Continued)

*Primary Examiner* — Terry Cecil
(74) *Attorney, Agent, or Firm* — Grasso PLLC; Fred Grasso

(57) ABSTRACT

Devices, processes, systems, and articles of manufacture adapted to treat contaminated fluid, such as organic wastewater, are described. These are described to include lifting contaminated fluids, treating contaminated fluids, or both, through gas application. In certain designs, gas, such as pressurized air, may be used to lift contaminated fluids, such as organic wastewater (i.e., water having contaminating organics of some kind, e.g. residential septic wastewater). In certain designs, gas, such as pressurized air, may also be used to treat fluids interfacing with the gas.

20 Claims, 9 Drawing Sheets

(56) References Cited

U.S. PATENT DOCUMENTS

| | | | |
|---|---|---|---|
| 5,609,754 | A | 3/1997 | Stuth |
| 6,018,909 | A | 2/2000 | Potts |
| 6,162,020 | A * | 12/2000 | Kondo ............................ 417/54 |
| 6,372,137 | B1 | 4/2002 | Bounds |
| 6,397,407 | B1 | 6/2002 | Dahlberg |
| 6,482,322 | B1 * | 11/2002 | Tsigonis ...................... 210/620 |
| 6,485,647 | B1 | 11/2002 | Potts |
| 6,576,130 | B2 | 6/2003 | Wallace |
| 6,605,219 | B2 | 8/2003 | Lambert |
| 6,726,401 | B1 | 4/2004 | Potts |
| 6,780,318 | B2 | 8/2004 | Fife et al. |
| 6,814,866 | B1 | 11/2004 | Potts |
| 6,887,383 | B2 | 5/2005 | Potts |
| 6,923,905 | B2 | 8/2005 | Potts |
| 6,959,882 | B1 | 11/2005 | Potts |
| 6,969,464 | B1 | 11/2005 | Potts |
| 6,997,202 | B2 | 2/2006 | Olander |
| 7,156,995 | B2 | 1/2007 | Maas et al. |
| 7,157,011 | B1 | 1/2007 | Potts |
| 7,234,484 | B2 | 6/2007 | Laws et al. |
| 7,309,434 | B2 | 12/2007 | Potts |
| 7,351,005 | B2 | 4/2008 | Potts |
| 7,374,670 | B2 | 5/2008 | Potts |
| 7,413,656 | B2 | 8/2008 | Allen et al. |
| 7,465,390 | B2 | 12/2008 | Potts |
| 7,744,759 | B1 | 6/2010 | Potts |
| 7,976,713 | B2 | 7/2011 | Ball |
| 8,047,808 | B2 | 11/2011 | Kondo |
| 2003/0164337 | A1 | 9/2003 | Maas et al. |
| 2004/0112435 | A1 | 6/2004 | Olander |
| 2006/0048817 | A1 | 3/2006 | Laws et al. |
| 2007/0166171 | A1 | 7/2007 | Kondo |
| 2008/0201018 | A1 * | 8/2008 | Graves .......................... 700/275 |
| 2009/0205745 | A1 | 8/2009 | Farese et al. |

OTHER PUBLICATIONS

Kerri, Kenneth et al., Operation of Wastewater Treatment Plants, vol. II, A Field Study Training Program, 7th ed., Office of Water Programs College of Engineering and Computer Science, California State University, Sacramento, CA, 2007.

Yoemans Series 4000 Catalog, Yoemans, Multiple Dates.

www.airliftpump.com; Mar. 7, 2010.

Yeomans Shone Series 4000 Pneumatic Ejectors, Yeomans Pump Aurora IL, 60504, Jun. 2006.

Kenneth Kerri, et al., Operation of Wastewater Treatment Plants—A Field Study Training Program, 1st ed., Sacramento State College, Dept. of Civil Engineering, 1970.

David A. Potts, et al., Effects of Aeration on Water Quality from Septic System Leachfields, Journal of Environmental Quality, vol. 39, Sep.-Oct. 2004.

Larry Hepne, et al., Alternative On-Lot Technology Research, Delaware Valley College, Research and Demonstration Center for On-Lot Systems and Small Flow Technology.

David A. Potts, et al., Effects of Soil Aeration on a Failing Community Leach Field, ASCA, Journal of Hydrologic Engineering, 2007.

Jose A. Amador, et al. Evaluation of Leachfield Aeration Technology for Improvement of Water Quality and Hydraulic Functions in Onsite Wastewater Treatment Systems, CICEET, Sep. 2, 2007.

Jose A. Amador, et al., Effects of Sand Depth on Domestic Wastewater Renovation in Intermittently Aerated Leachfield Mesocosms, ASCE, Journal of Hydrologic Engineering, Aug. 2008.

Geomat, High Performance, Low Profile, wastewater infiltration and reuse systems, Brochure 2008.

Soil-Air Systems, Brochure, 2010.

Jose A. Amador, et al., Breath of Fresh Air, CICEET.

* cited by examiner

PRESSURIZED GAS LIFTING AND GAS REJUVENATION

CROSS-REFERENCE TO RELATED APPLICATIONS

This application is a Continuation-in-Part of U.S. nonprovisional application Ser. No. 13/836,061, filed on Mar. 15, 2013 and entitled "Pressurized Gas Lifting and Gas Rejuvenation" The '061 application is a nonprovisional of and claims priority to U.S. provisional patent application No. 61/647,634, which was filed on May 16, 2012 and is entitled "Pressurized Gas Water Lifting and Gas Rejuvenation."

TECHNICAL FIELD

Lifting fluids, treating fluids, or both, through gas application is described. More specifically, gas, such as pressurized air, is used to lift fluids, such as water with organic waste; and gas, such as pressurized air, is used to treat the fluids, such as water with organic waste, interfacing with the gas; or both.

BACKGROUND

Fluids, such as wastewater, may be treated to protect the environment and public health. Fluids to be treated may include pollutants and microorganisms that are each detrimental to the environment as well as detrimental to people, wildlife, and the flora and fauna within the environment.

Contaminated fluid is treated to render the fluid more suitable for subsequent use or discharge. Treatment can include separating, modifying, removing, and destroying objectionable, hazardous, or pathogenic substances in the fluid. To this end, treatment serves to remove unwanted materials with little or no affect on the fluid composition itself. For example, if the fluid is water, the molecular structure of the water remains unchanged after treatment.

Various phases of contaminated fluid treatment are employed to address various contaminants and the unique treatment circumstances presented by each. In the end, the goals can include removal or reduction of the levels of the impurities, contaminants, and solids from the contaminated fluid in order to collect, handle, and dispose of the fluid safely, or with reduced harm to humans or the environment.

Various discharge standards and quality standards apply when testing effluent safety and treatment effectiveness of fluids. For organic wastewater applicable standards can measure turbidity (suspended solids), biochemical oxygen demand (BOD), coliform organisms, pH, remaining heavy metals, remaining chemical compounds, and remaining organic compounds.

BRIEF SUMMARY

Embodiments can include devices, processes, systems, and articles of manufacture adapted to treat contaminated fluid, such as organic wastewater. These embodiments may include lifting contaminated fluids, treating contaminated fluids, or both, through gas application. In embodiments, gas, such as pressurized air, may be used to lift contaminated fluids, such as organic wastewater (i.e., water having contaminating organics of some kind, e.g. residential septic wastewater in various stages of treatment). In embodiments, gas, such as pressurized air, may also be used to treat fluids interfacing with the gas.

In embodiments employing residential or other septic systems or components of these systems, wastewater received from one or more pre-treatments, may be accumulated in a vessel and then discharged from the vessel using pressurized gas, such as air. Upon leaving the vessel, the pressurized gas may serve to rejuvenate the fluid during transport and further downstream handling, treatment and discharge. This discharge may be made to a leaching field, a river, a body of water, a municipal plant, a community septic system, a community wastewater system, and/or a subsequent wastewater system.

In embodiments employing municipal treatment systems or components of these systems, wastewater from a pre-treatment may be accumulated in a vessel and then discharged from the vessel using pressurized gas, such as air. Upon leaving the vessel, the pressurized gas moving with or after discharged fluid may serve to rejuvenate the fluid during transport and further downstream handling, treatment and discharge. The discharge of fluid, gas, and mixed fluid and gas may each be made to a leaching field, a body of water, and/or a subsequent wastewater system.

In embodiments, the rejuvenation of organic wastewater may include use of reactive gases that support aerobic activity in the organic wastewater. This treatment can result in reductions in biological oxygen demand (BOD), turbidity, total suspended solids (TSS), pathogens, nitrogen, phosphorus and other contaminants.

Other affects may also ensue in embodiments from the rejuvenation of the organic wastewater or other contaminated fluid. For example, if nonreactive noble gases are employed in disclosed or other embodiments to pressurize a vessel accumulating contaminated fluid and to subsequently rejuvenate the contaminated fluid, the rejuvenation may include the action of the nonreactive noble gases percolating through the fluid, which can include the release of solids suspended in the fluid.

In embodiments, a downstream infiltration system may include septic leaching systems comprising a leaching field, or other discharge and treatment configuration, as well as other infiltration systems, that may or may not include treatment media into which the water may be discharged. Still other downstream infiltration systems may be used as well. Embodiments include flowing air in or around the system anywhere clogging can occur in or around the system, including outside of the system.

In embodiments, air or another gas may be in fluid communication with a pressure vessel containing water, such as wastewater, with or without organics, pretreated wastewater, or storm water, to be lifted from a lower position to a higher position, wherein in the higher position the water may be discharged into a downstream system including an infiltration system. The air or other gas may be pressurized ahead of flowing into the pressure vessel or may develop pressure as it gathers in the pressure vessel or both. Still further, the gas may be compressed by the additional introduction of air or other gas into the sealed space holding the water.

Still further, in embodiments, the gas may be pumped into the pressure vessel, as well as flow into the pressure vessel because of a pressure difference between the gas and the pressure vessel containing the water. In embodiments, the pressure vessel may be sealed or otherwise designed such that the air or other gas is compressed and pressure increases as additional air or other gas enters the pressure vessel. A pressure relief valve may be present to relieve high pressure levels.

In embodiments, pre-treatment ahead of the vessel may include passing the wastewater or other fluid through a treatment tank, such as a septic tank, aerobic tank, media treatment system or other settlement or clarification device or system. In preferred embodiments the pre-treatment provides clarification of organic wastewater or fluid and removes sediment or debris or other waste ahead of the wastewater or fluid reaching an intake or filter. Accordingly, in embodiments, gas may provide chemical or biological rejuvenation with reactive gases, such as promoting an aerobic environment or neutralizing volatile organic compounds in the fluid. And, in embodiments, gas may provide mechanical rejuvenation with reactive and nonreactive gases when, for example, these gasses bubble through after discharge from the pressure vessel, during downstream transport, and serve to release solids from a colloidal suspension or other type of fluid suspension. In each instance and in various embodiments, gas may also serve to remove dissolved materials from a fluid through reactive and nonreactive gas interfaces or interactions with the fluid or the materials or both.

DETAILED DESCRIPTION

Figure 1:
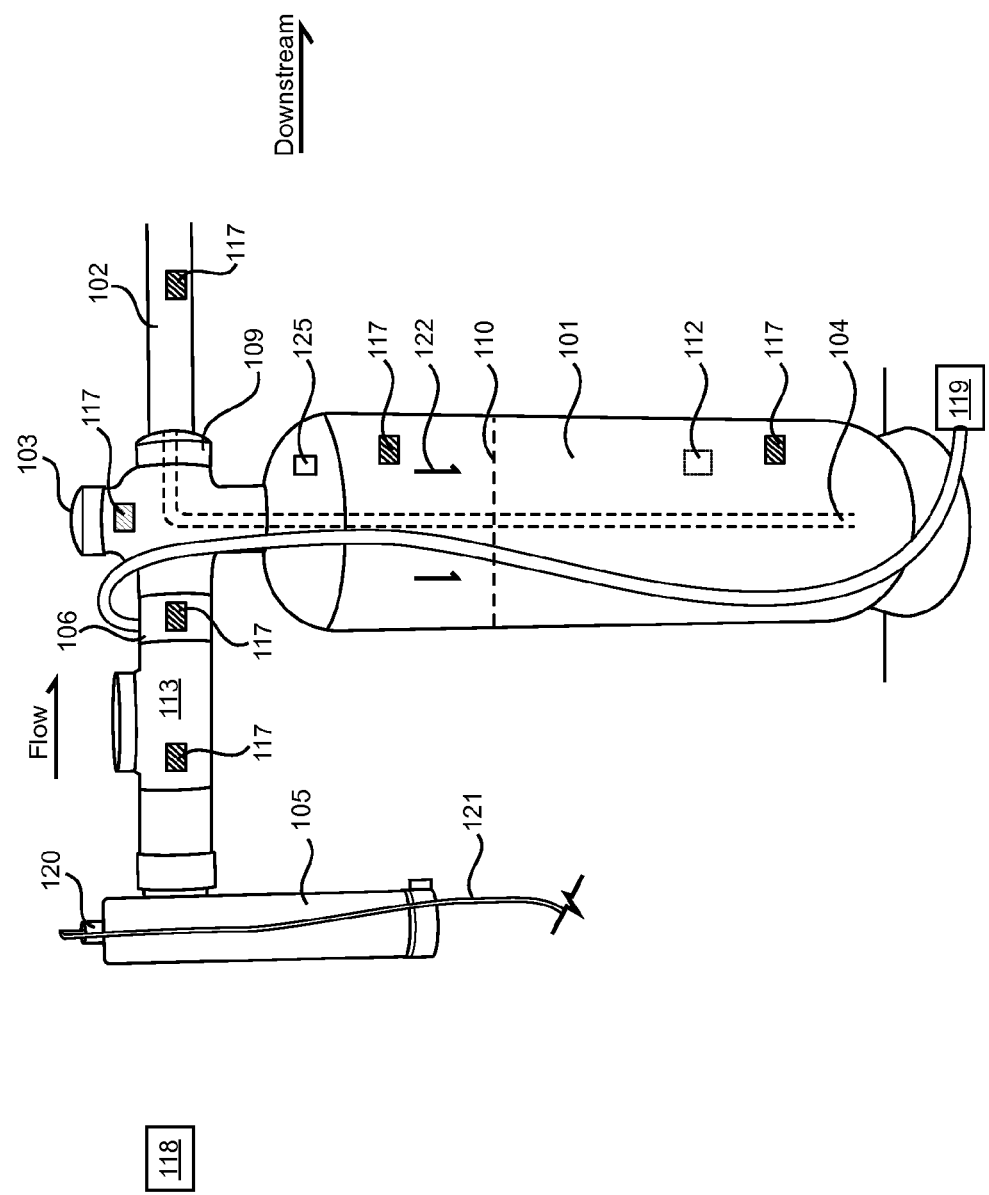
FIG. 1 is a perspective view of system components as may be employed in embodiments.

As noted above, embodiments can include devices, processes, systems, and articles of manufacture adapted to treat contaminated fluid, such as organic wastewater. These embodiments may include lifting contaminated fluids through gas application, treating contaminated fluids through gas application, pressurizing a conduit with orifices to spread out the contaminated fluid, or all of the above. In embodiments, contaminated fluids may accumulate in a vessel and then be removed from the vessel by building pressure in the vessel through the introduction of gas into the vessel, behind the accumulating fluid. When the pressure in the vessel from the introduction of gas into the vessel is high enough the pressurized gas can serve to purge fluid from the vessel. Pressures sufficient for discharge of wastewater may be less than 5 psi and can be 10 psi or 15 psi, and may have one psi increments within these ranges, or be higher still. Other pressures, including those identified below, may also be used.

In embodiments the gas may also interact with contaminated fluid as the fluid travels away from the vessel and moves through a treatment system downstream of the vessel. This interaction can be a chemical interaction, a biologic interaction, a mixed biologic/chemical reaction, and a mechanical interaction. The chemical and biological interactions may be promoted by using reactive gases while the mechanical interactions may be promoted when using reactive and nonreactive gases.

As described throughout, embodiments may be used to treat fluids, such as water, to treat the system and components of the system handling the fluid, and to treat the surroundings of the system and the components handling the fluid. In other words, in a residential septic system employing a settling tank and a leaching system surrounded by a leaching medium of some kind, for example pea stone or sand or plastic media, the gas may not only treat the organic wastewater in the system it may also serve to treat the walls and surfaces of the leaching system, the pipes connecting them, the slots of the leaching field and the leaching medium surround or otherwise interfacing with the leaching system components. Should biomat or other organic deposits (cumulatively biomat) develop on any of these surfaces or mediums, the gas, which can be air or other oxygen containing gas, can promote aerobic activity that in-turn reduces the biomat on the surfaces of the system components as well as on the soil, sand, granular material, and other material surrounding or beneath the septic tank, the leaching field, and the conduits connecting these components of the residential septic system.

As noted, the gas may be a reactive gas such as air or oxygen, and may be a nonreactive gas as well, such as a noble gas, e.g., helium or argon. Combinations of reactive and non-reactive gases may be used as well. Still further, the fluid may be water, and may be, among other things: septic tank effluent (STE) pretreated wastewater; organic wastewater; nonorganic wastewater; and storm water.

FIG. 1 is a perspective view of a system as may be employed in accord with embodiments. Visible in FIG. 1 are pressure vessel 101; line to downstream treatment system 102; clean out 103; discharge inlet 104; filter 105; gas source/air compressor inlet 106; air compressor/pressure source 119; seal 109; pressure vessel water level 110; pressure vessel vent 125; internal air pressure 122; bubbler 112; valve 113; sensor 117; controller 118; filter sensor 120; and filter signal line 121.

In embodiments, including but not limited to the system of FIG. 1, a pressure differential may be created to act on water in the pressure vessel 101 and lift the water from a storage or lower position to a discharge or higher position. During operation, the air or other gas may continue to enter the pressure vessel until such time as enough pressure exists in the pressure vessel to urge the water into the discharge position where it may flow or be transported downstream and into further systems. Upon being lifted or moved from the storage position, or lower position, to the discharge position, the water may flow or otherwise move in the line 102 towards one or more subsequent infiltration systems. These subsequent treatment systems, which can include sand filters and soil infiltration system, may further use the gas to treat the wastewater or other fluid that was accumulated and purged from the pressure vessel 101. In a residential septic system, for example, air may be used as the compressed gas and the oxygen in the air may serve to promote removal of BODs from the organic wastewater as the wastewater travels towards and in downstream treatment components, which can include a leaching field. The oxygen may also serve to treat the surfaces of the line 102 as well as surrounding materials if the pipe provides for leaching.

In preferred embodiments, the organic wastewater entering the filter 105 is pretreated to reduce or remove solids, sediment, debris or other foreign matter. The pretreatment may also preferably serve to clarify the organic wastewater entering the filter 105. In so doing, downstream check valves or other components may be less likely to be held open, stick or be otherwise fouled by buildup of sediment or sludge or an obstruction carried in the wastewater. As a safety mechanism, the vent 125 may serve to regulate internal pressures in the pressure vessel. The vent may contain a pressure relief valve that vents when pressures in the vessel exceeded a safe pressure. This vent can vent to the immediate area and may also vent to a distant location through piping to that remote area. Also, in embodiments, the pressure vessel may have a 40 gallon capacity or various other capacities, both larger and smaller.

Figure 6C:
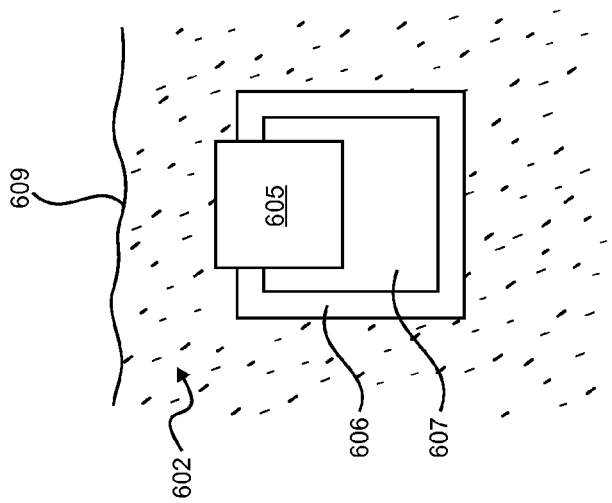
FIGS. 6a-6c show examples of leaching field components as may be employed in embodiments.
Figure 6B:
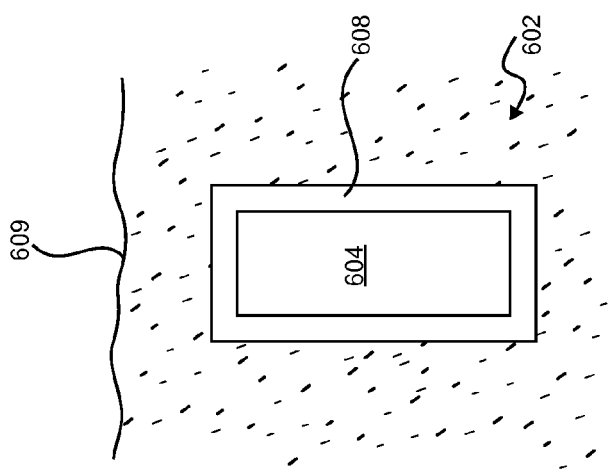
Figure 6A:
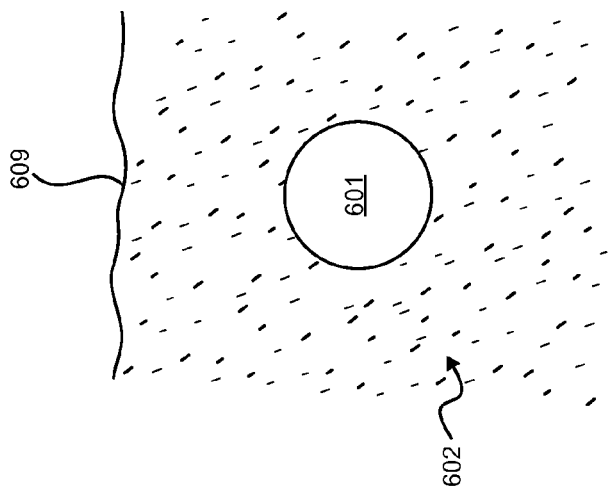

FIGS. 6a-6c provide examples of leaching field components that may receive treatment from the gas as may be employed in embodiments. These leaching field components can include conduit 601, conduit 604, and conduit 605. As can be seen, the conduits can be a pipe as well as have various cross sections, including squares and rectangles. Other cross-sections are also possible. These conduits may be below a surface 609 and may be surrounded by, adjacent to or above treatment mediums or leaching mediums 602, 606, 607, and 608. These leaching mediums may be a granular material 602, such as soil, pea stone, sand, gravel, stone, and the like. The leaching mediums may also be a nonorganic formed filter material 606, 607, and 608, such as a plastic grid, a repeating formed shape, and various other means for filtering and/or biotreatment of leachate from a leaching conduit. These various materials, filter materials, and means may also be intermixed and organized in various ways different from those shown in FIGS. 6a-6c. As noted above, these mediums, materials, filter materials, and means, may themselves be treated by the gas from the pressurized vessels in embodiments. This treatment may include reducing or removing biomass and providing oxygen in support of aerobic activity in and around the mediums, materials and means.

Accordingly, in embodiments, gas used to move the water or other fluid may also act further from initially serving to displace the water or other fluid by rejuvenating the water or other fluid as it moves in line 102. The gas may also act on the system surroundings or the treatment system itself in which the water may flow, acting to rejuvenate either or both. If the gas used to move the water or other fluid is a reactive gas it may also act on the system in which the water or other fluid is moving and may promote rejuvenation of the system in addition to rejuvenation of the water or other fluid. This rejuvenation may include rejuvenation of soil and treatment media downstream of the pressure vessel 101; inner linings or walls of the components of the system; slots, crevices, orifices or other openings including but not limited to interfaces between soil and the system; and other components or portions in and around the system as well. This includes the components as shown in FIGS. 6a-6c as well other downstream components.

Figure 2:
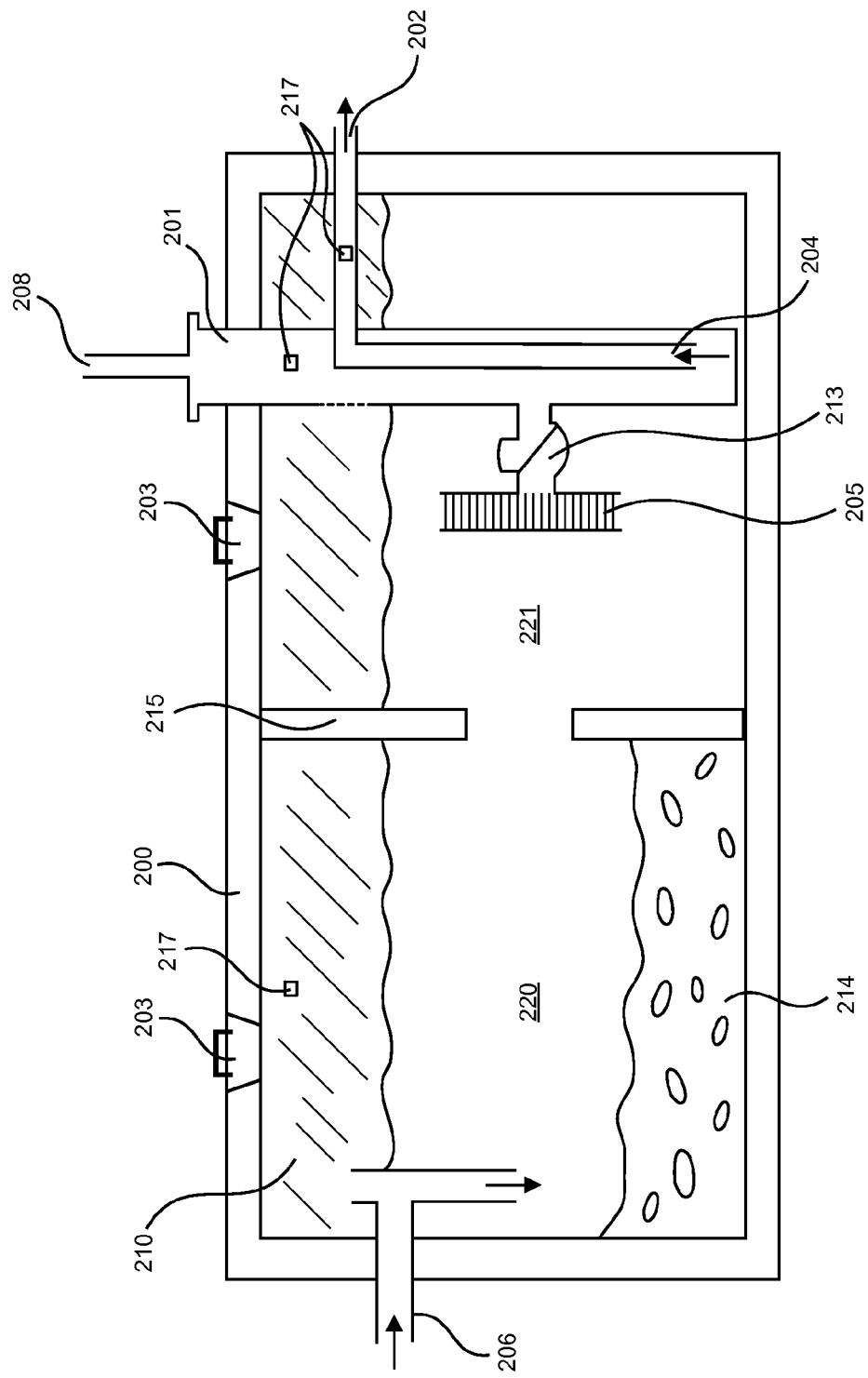
FIG. 2 is a sectional view of system components as may be employed in embodiments.

FIG. 2 shows a sectional view of components of a system as may be employed in accord with embodiments. As can be seen in FIG. 2, a septic tank 200 may receive wastewater through inlet pipe 206. This pipe 206 may be in fluid communication with the line 102 of FIG. 1, with a septic discharge line of a residential home, and with other sources of contaminated fluids, such as organic wastewater. The tank 200 in FIG. 2 is shown to contain a baffle 215, two clean-outs 203, a filter 205, a gas source input 208, a pressure vessel 201, a discharge inlet 204 within the pressure vessel 201, a check valve 213 in fluid communication with the pressure vessel, an air gap 210, and sludge 214. In use, organic wastewater may enter the tank 200 through input 206. Sludge or other solids in the wastewater may fall to the bottom of the tank 200 and serve to comprise the sludge 214. The wastewater, now pretreated, with sediment reduced or removed, may flow from the initial chamber 220 to the second chamber 221 of the tank and may then enter the pressure vessel 201 by passing through the filter 205 and the check valve 213. Within the pressure vessel gas pressure may build above the surface of the wastewater therein and may reach a value under which the wastewater is purged from the vessel 201 and out the line 202 to downstream infiltration system components. These downstream components may include those shown in FIGS. 6a-6c.

Accordingly, embodiments may include multiple pressure vessels for moving wastewater or other fluids. A first pressure vessel may be located near the source, as is shown in FIG. 1. This pressure vessel may be within a residential home. And, a subsequent pressure vessel may be located outside of the residential home, buried below grade in a septic tank. These pressure vessels may be placed at other locations of a treatment system as well, serving to accumulate fluid and discharge the fluid at some interval or accumulated volume.

In preferred embodiments wastewater received by the vessel is pretreated before reaching an upstream filter or check valve of the vessel. This pretreatment is preferably performed upstream by a settlement tank or other treatment system, such as a settlement pipe, aerobic tank or chamber. Other pretreatment systems may also be used, including sediment chambers, septic tanks, treatment tanks, multi-chamber filtering, septic tank effluent filter, and multi-surface filtering. A preferred outcome of this pretreatment would be to limit or remove sludge and foreign debris from organic wastewater before reaching the vessel.

Sensors 217, like those shown in FIG. 1, may also be used to monitor the pressure vessel and the septic tank of FIG. 2. These sensors can monitor accumulated pressure, accumulated fluid level, temperature, BOD, oxygen, pH, or other variable and may be used for treatment system management and operation. For example, when pressure levels in the vessel 201 are measured as reaching a target value, the input of further gas flow through input 208 may be stopped, likewise, if BOD levels are higher than expected in the pressure vessel 201 or either of the chambers 220 or 221, additional oxygen or air may be pumped into the tank 200 or more specifically the vessel 201 to promote aerobic activity and treatment of the BOD.

FIGS. 3A-3D show sectional views of a pressure vessel as may be employed in embodiments. The vessel 300 is shown with various configurations of sensors 317, air inputs 308, fluid inputs 306, discharge lines 302, and corresponding discharge inlets 304. Also visible is the fluid level 301 within the vessel 300 and the valve 313 in fluid communication with the vessel 300 and the input 306. These vessels may be employed as described throughout.

In embodiments, a pressure vessel may be made from fiberglass, non-reactive metals, concrete, PVC, as well as other suitable materials. And, in use, the vessel may be vented between doses of fluid to equalize the vessel interior to atmospheric pressure using an actuated valve. The vessel can also be configured in certain embodiments to vent through the discharge line. This venting cycle may be used for calibrating the system as well. Still further, downstream discharge of gasses flowing through the vessel may serve to control or preferably reduce odors associated with the wastewater. In other words, in embodiments odorous gases rather than being vented to atmosphere may be preferably discharged to a permeable media filter, the leach field or other post treatment system to infiltrate wastewater and treat odors and manage odors emanating from the wastewater.

Figure 3B:
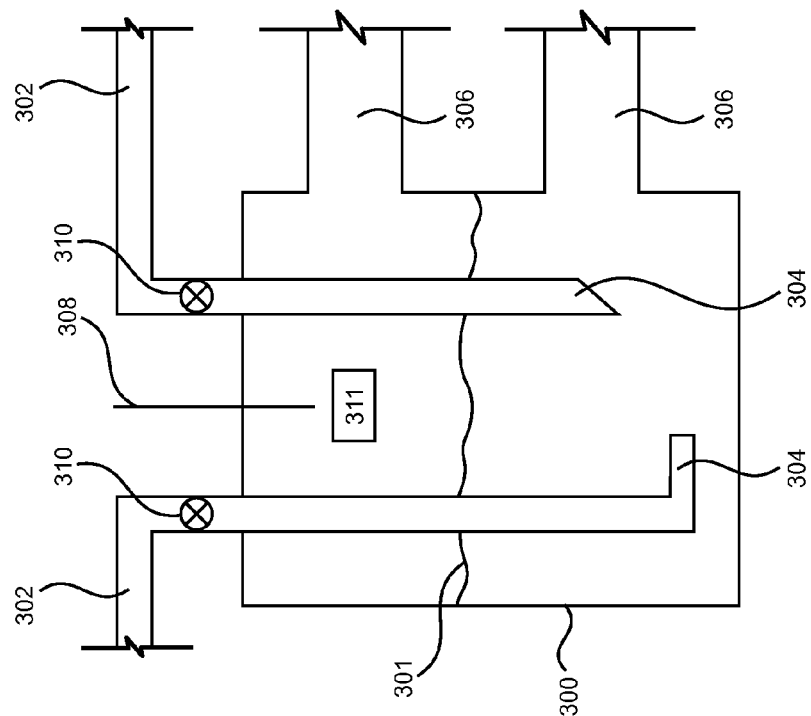
FIG. 3B is a sectional view of a pressure vessel having an air input, a water input, and multiple discharge pipes as may be employed in embodiments.
Figure 3A:
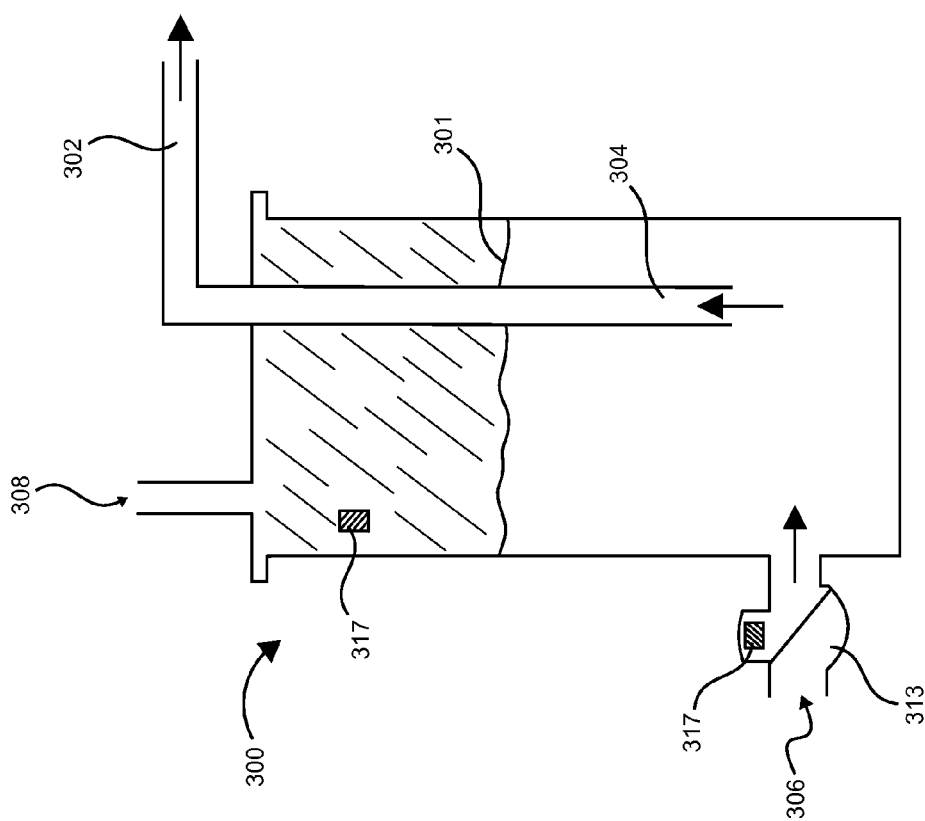
FIG. 3A is a sectional view of a pressure vessel having an air input, a water input, and a discharge pipe as may be employed in embodiments.
Figure 3D:
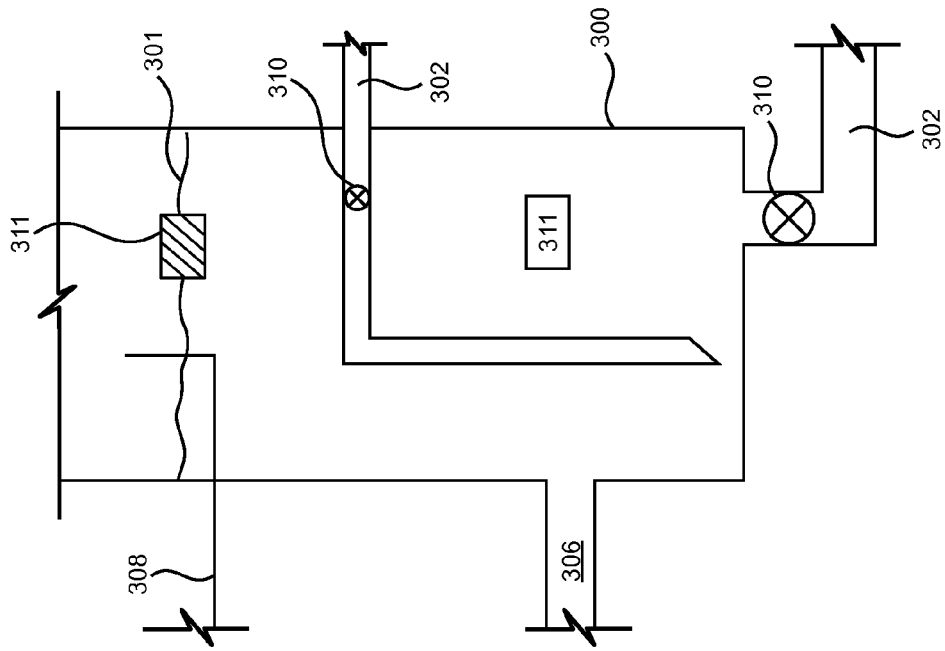
FIG. 3D is a sectional view of a pressure vessel having an air input, a water input, and multiple discharge pipes as may be employed in embodiments.
Figure 3C:
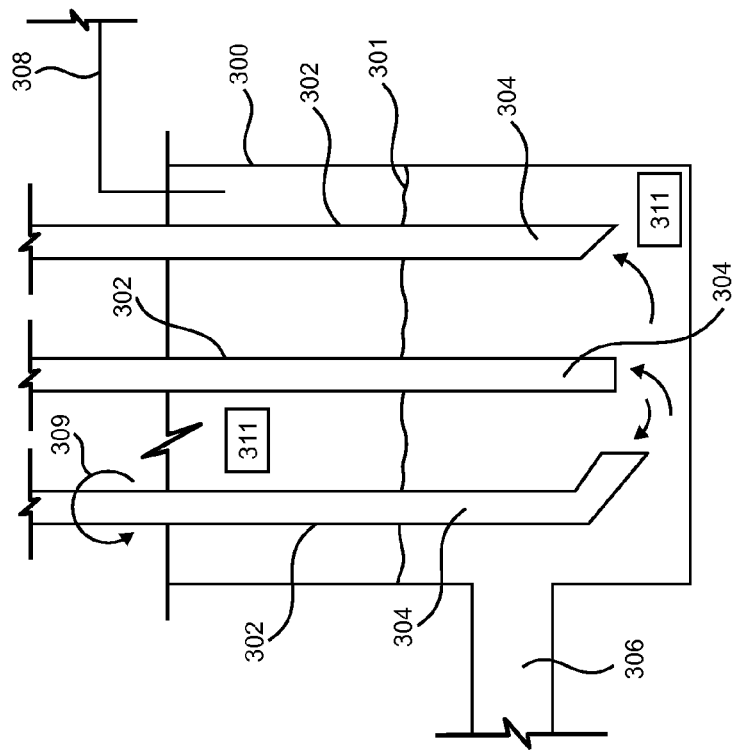
FIG. 3C is a sectional view of a pressure vessel having an air input, a water input, and multiple discharge pipes as may be employed in embodiments.

As can be seen in FIGS. 3B-3D multiple discharge lines 302 may be used. These lines 302 may be used to distribute effluent to various different discharge points and for other reasons as well. Also visible is that the discharge inlets 304 may have various configurations. These can include angled intakes, tapered intakes, curved intakes and other configurations as well. These intakes may also be moved to be at or set at different input elevations relative to each other and may be oriented in different directions as well as being rotatable about an axis to change their orientation. This rotation is illustrated by arrow 309 in FIG. 3C and the various input points are shown in FIGS. 3B-3D. Also, the air input may itself have different terminating elevations in the pressure vessel.

As can be seen, for example, the terminating elevation of the air input 308 is shown between the two water inputs 306 and the water surface 301 while in FIG. 3B the terminating elevation of the air input 308 is shown above all inputs 306 and the water level 301. A backflow valve 313 is preferably used in embodiments to allow for fluid to enter the pressure vessel. Backflow valve 313 is shown near the pressure vessel in FIG. 3A and not in FIGS. 3B and 3C. The discharge lines may themselves have valves 310. These valves may provide for controlled distribution from the pressure vessel.

Through these multiple discharge lines 302, various downstream discharge points may receive or not receive discharge from the pressure vessel depending upon which valves 310 are open. This variability may allow the pressure vessel to balance downstream flows and serve as a distribution box, i.e., a D-box. This may be a preferred configuration when the pressure vessel is mounted in or proximate to a septic tank such that uniform flows to downstream leaching fields can be achieved.

The rotatability of discharge lines with angled or extended discharge inlets can serve to agitate sludge levels that may rise to the inlet level. In preferred embodiments sludge in the pressure tank will be minimized through upstream treatment, but, should levels undesirably rise, the inlets may be used to agitate and dislodge the sludge. Moreover, in embodiments the lines may be moveable up and down such that there elevation within the pressure vessel can be controlled. This variability in elevation may serve to keep input levels well within the water level and away from any bottom sludge levels.

Still further, in embodiments, the discharge lines 302 may be purged from time to time. This purging may serve to send additional gasses downstream to the leaching fields and further rejuvenate the leaching fields through the introduction of restorative gases. This purging may timed with periods where no fluid is entering the pressure vessel or the input valves to the pressure vessel, such as valve 313, has been closed to permit purging and downstream restoration.

Figure 4:
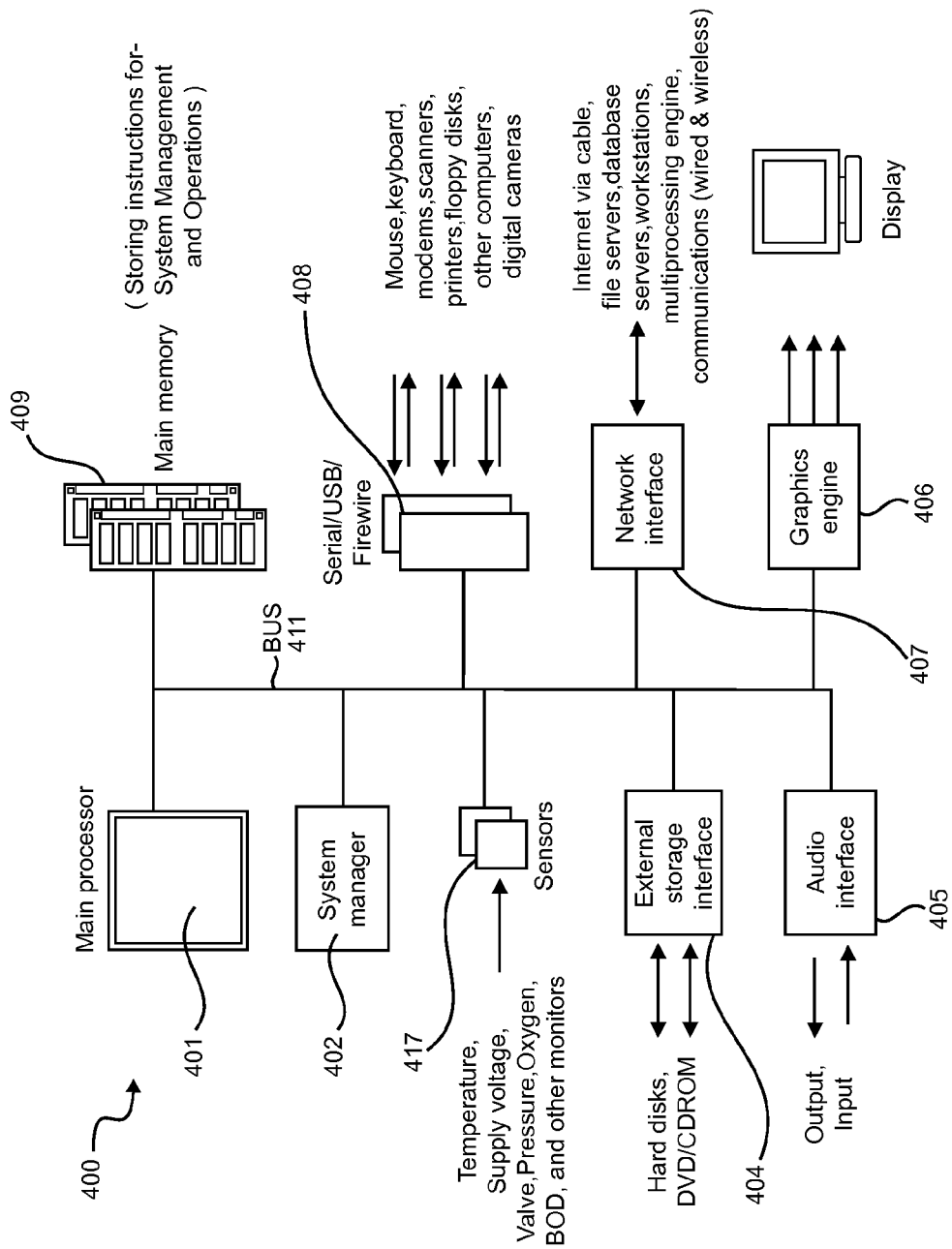
FIG. 4 is a schematic view of a controller as may be employed in embodiments.

FIG. 4 is a controller as may be employed in accord with embodiments. The controller 400 is shown with a bus 411 in communication with a main processor 401, a system manager 402, sensors 417, an external storage interface 404, an audio interface 405, main memory 409, serial/USB/Firewire communication ports 408 network interface 407, and graphics engine 406.

In use, the main memory 409 may store instructions for carrying out embodiments, such as those specifically described in this disclosure. These instructions can include instructions for monitoring the sensors 417 and providing system commands to operate pumps, valves, and gas sources used in embodiments. When sensors indicate that threshold pressures have been reached in a pressure vessel the controller may send commands to a pump or other pressure source to stop. Likewise, if BOD levels are sensed to be high, a gas including oxygen or a higher concentration of oxygen may be activated such that the oxygen levels may be increased in the pressure vessel, the septic tank, the lines or elsewhere in the treatment system. Still further, if valves or filters are sensed to be clogged or non functioning, pressure developed in the vessel may be increased to clear any clog, to promote maintenance, or to repair any obstruction. Alerts of the clogged or malfunctioning filter may be provided by the controller as well. Preferably, pretreatment may be provided to reduce clogging of input filters or valves of the pressure vessel and to reduce or eliminate obstructions from interfering with wastewater flow through the pressure vessel.

The controller may provide for programming or adjustment by a user, such as a system administrator or home owner. These adjustments can include setting variations for dosing time, dosing intervals, BOD levels, pH levels, alert preferences and for other things as well. In embodiments, these alerts can be sent over a network such that a home owner, other user, system operator, regulatory agency or similar interested party may be alerted of the status of the treatment system. These status alerts can include providing notice of the dosing time, dosing intervals, volumes of water treated, BOD levels, pH levels, pressure, oxygen, temperature, clogging, filter condition and supply voltage of components of the treatment. These alerts may be sent over a network and may be received by a user's phone, tablet computer, or other computing device.

Figure 5:
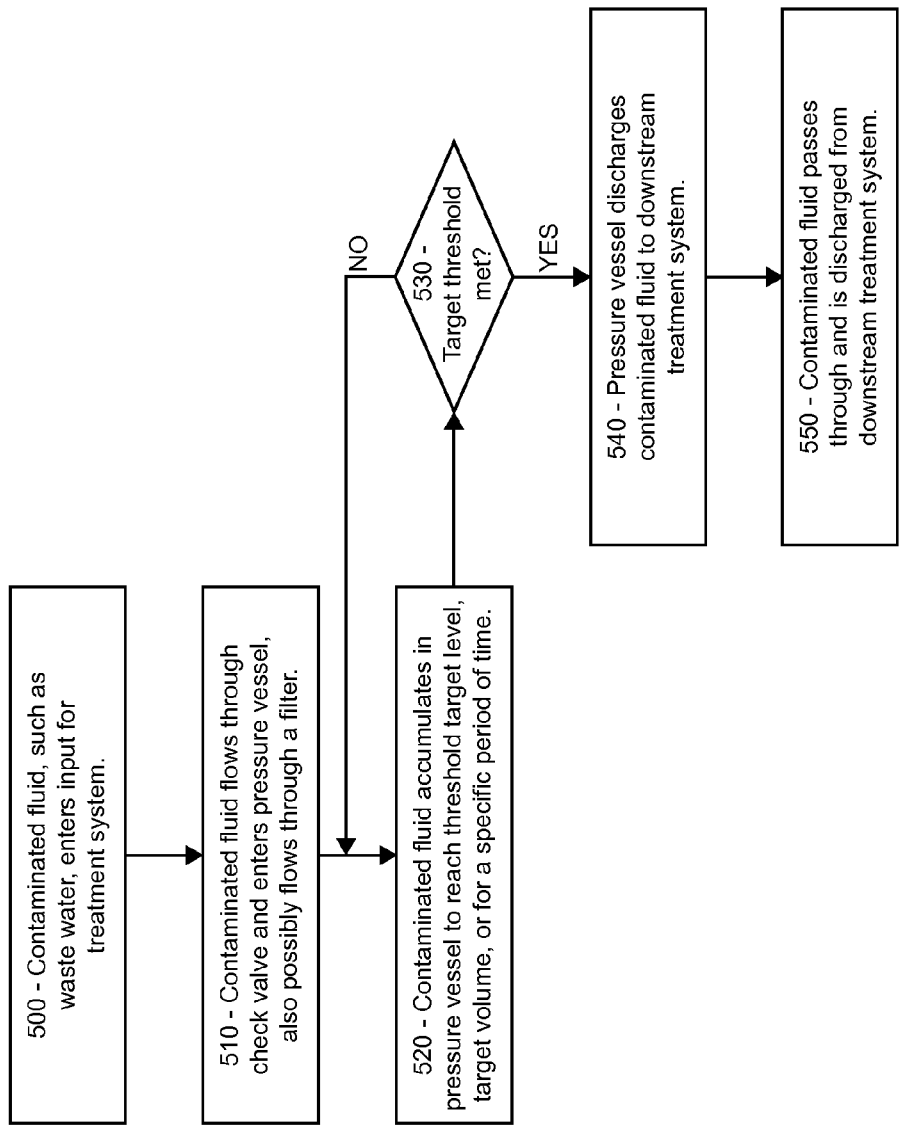
FIG. 5 shows process aspects as may be employed in embodiments.

FIG. 5 shows process features as may be carried out in embodiments. FIG. 5, as well as the remainder of the specification, contains features of embodiments which may be carried out in various orders, with various changes or modifications, and with different, fewer or more particular features as well.

As can be seen in FIG. 5 at 500, wastewater may flow into a septic tank, treatment tank, reservoir pump tank or the like in embodiments. This may further include, as shown at 510, wastewater passing from the septic tanks, reservoir tank or the like, through a filter and through an input check valve. As explained at 520, as the wastewater enters it preferably accumulates in the vessel until the fluid reaches a target threshold of some kind. Thus, if a sufficient volume of wastewater has accumulated during the forward flow cycle to activate the dose to the downstream treatment system, the process is repeated. Otherwise, wastewater will accumulate until an input such as a prescribed level or time interval is met. This threshold can include a pressure target, a depth, and a duration of time.

As shown at 530, in embodiments, if the threshold is not met, fluid is allowed to continue to accumulate and when the threshold is met the fluid may be preferably discharged from the vessel and towards downstream treatment system. Once the wastewater is at a desired elevation, a float switch or equivalent functioning device signals the blower, compressor or pressure generator to energize and charge the pressure vessel to the necessary pressure. This can also be done by simply turning on the blower, etc. at a specific time interval, as well as upon receipt of an activation signal. When the pressure builds in the pressure vessel, the wastewater is displaced from the pressure vessel up the piping and to the discharge point. The air may then flow downstream, through the discharge point, towards and into downstream infiltration system components at prescribed intervals. This flow may serve to promote a prescribed restoration objective, such as aerobic biological activity in the system and around the downstream system. Subsequent to the discharge at 540, the fluid may pass through the treatment system and be discharged from it, which is shown at 550. Subsequent to the discharge at 540, gases may also pass to and through the infiltration/treatment system for odor control or remediation and for other reasons described herein as well. In embodiments, if wastewater is being simultaneously generated during the pumping or aeration cycle, it can also accumulate in the tank, piping, or a similar reservoir. Moreover, the process may repeat again. Still further, in embodiments, water may enter the pressure vessel, activating the float switch and turning on the blower and the pressure vessel may be pressurized for a period of time or until the backpressure drops. Also, in embodiments, a processor may review the position of the status of a float level or other sensor and turn off a blower in order to let water enter the pressure vessel and then turn blower back on. This may be repeated in part or in whole as needed. If the float is seen as low then a pressure interval of air may be introduced or allowed to continue if running.

In embodiments, gas within the infiltration system may flow under pressure too. This pressure may promote rejuvenation as well serve to push wastewater or another fluid, under pressure, in promotion of the distribution of the wastewater or other fluid in the infiltration system. In other words, and for example, pressurized air may remain in the treatment system after the wastewater leaves the pressure vessel and this gas pressure may serve to urge the wastewater downstream in the system and to force seeping or leaching of the wastewater out of the system into the surrounding leaching materials. This can include forcing the wastewater from orifices, such as slots in the pipe or gaps in the conduits, and into adjacent filtering materials, such as stone, or sand, or soil.

Figure 7:
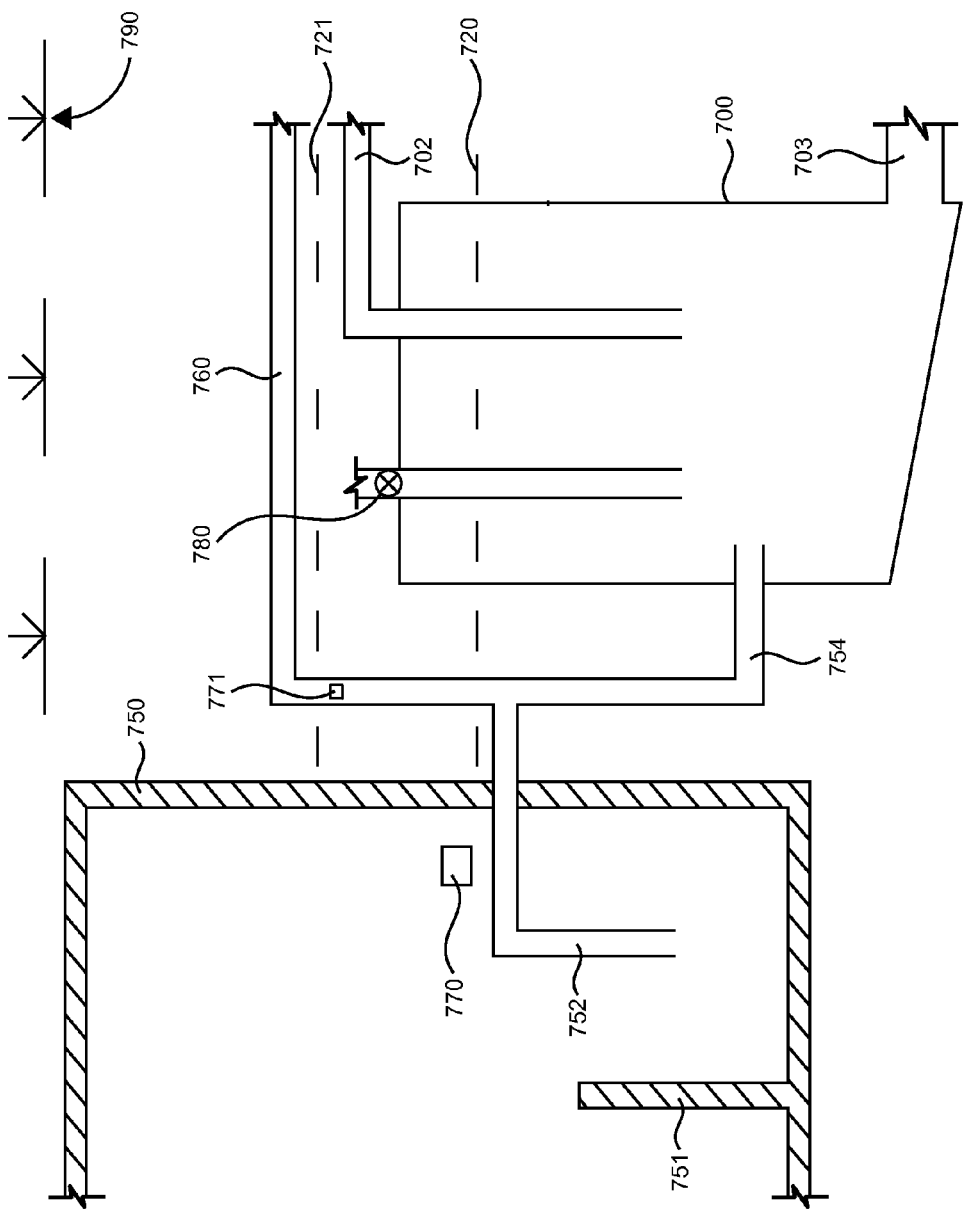
FIG. 7 is a sectional view of upstream treatment and a pressure vessel as may be employed in embodiments.

FIG. 7 shows a partial side elevation of an upstream treatment system 750 in communication with a pressure vessel 700 below a surface 790 as may be employed in embodiments. As can be seen in FIG. 7, embodiments may have configurations and components to reduce the risk of overflow. The pressure vessel 700 and the upstream treatment system 750 may be positioned partially or completely below the surface 790 and may be piped such in the event of a compressor failure, power outage, blockage or overflow from the pressure vessel may revert to overflow piping 760 and be sent to a standby leach field, a downstream system or an auxiliary system or both. The pressure vessel 700 and the treatment system 750 may also employ sensors 770 and 771, which can include mechanical and electronic float switches, and may detect fluid levels or gas concentrations or gas pressures etc., and can serve to assist in triggering overflow alarms, the pressurization and depressurization of a pressure vessel, and the movement of control valves. When fluid levels in the pressure vessel rise to a target level, for example the normal discharge elevation 720, a sensor 770 may detect this invert elevation fluid level and may send signals that serve to trigger a pressure source to start or run or otherwise supplement pressure in the pressure vessel 700. This increase in pressure may serve to purge the fluid in the pressure vessel and send gas downstream as well. Also labeled in FIG. 7 are baffle 751, treatment system outlet 752, pressure vessel inlet 754, and pressure vessel outlet 703.

Additional sensors may also be used such that when fluid levels rise to high levels an alarm may sound and various measures may be undertaken. These measures may include increasing pressures in the vessel to purge the vessel, opening or closing discharge lines from the vessel and slowing or stopping input to the pressure vessel as well. Valves may control flow to main and secondary downstream treatment systems such that regular flow may move towards a first system and emergency or secondary flow may move towards another system. A valve and discharge line 702 may feed the primary downstream system while the valve 780 may feed a secondary or auxiliary system or another primary downstream system. When overflow is sensed in embodiments both valves may be opened to increase flow out of the pressure vessel. The valves may remain open for a period of time after the pressure vessel is purged to provide for remediation downstream of the pressure vessel—perhaps clearing any obstructions and for other reasons as described herein or otherwise as well.

In embodiments invert elevations may be set to provide overflow channels from the pressure vessel to a downstream system as well. As can be seen in FIG. 7 the overflow piping 760 is set above the other shown discharge piping and is below the uppermost volumes of the treatment system 750. Thus, in operation, should fluid levels rise in the pressure vessel beyond normal levels 720 the overflow piping can serve to send fluid downstream after sufficient accumulation in the treatment system 750 and before the treatment system 750 has reached its maximum capacity. When fluid is flowing through the overflow piping the sensor 771 may signal the overflow state and may assist in sounding an alarm as well as opening valves 780 and 781. Upstream adjustments may be made as well.

In embodiments, including those systems with septic and other similar tanks, in the event that the compressor is not operable due to a mechanical failure, power outage or for another reason, a high-level overflow can be designed into the tank. For example, if the compressor or blower is inoperable, and water backs up from the pressure vessel into the septic tank to an elevation where the level sensor, such as a float switch should activate the compressor, but cannot, a high-level overflow port is provided just above the elevation where the float activates the compressor. Water that overflows can be flowed into a secondary leach field or tank or other destination. Also, the sensor remaining in a high position for more than a predetermined period of time, for example fifteen minutes, can activate an alarm. Additional alarms can also be configured into the tank(s) or leach field to indicate other unwanted fluid states and system conditions (including presumed clogging, inoperable valves, and accumulated sludge).

Figure 8:
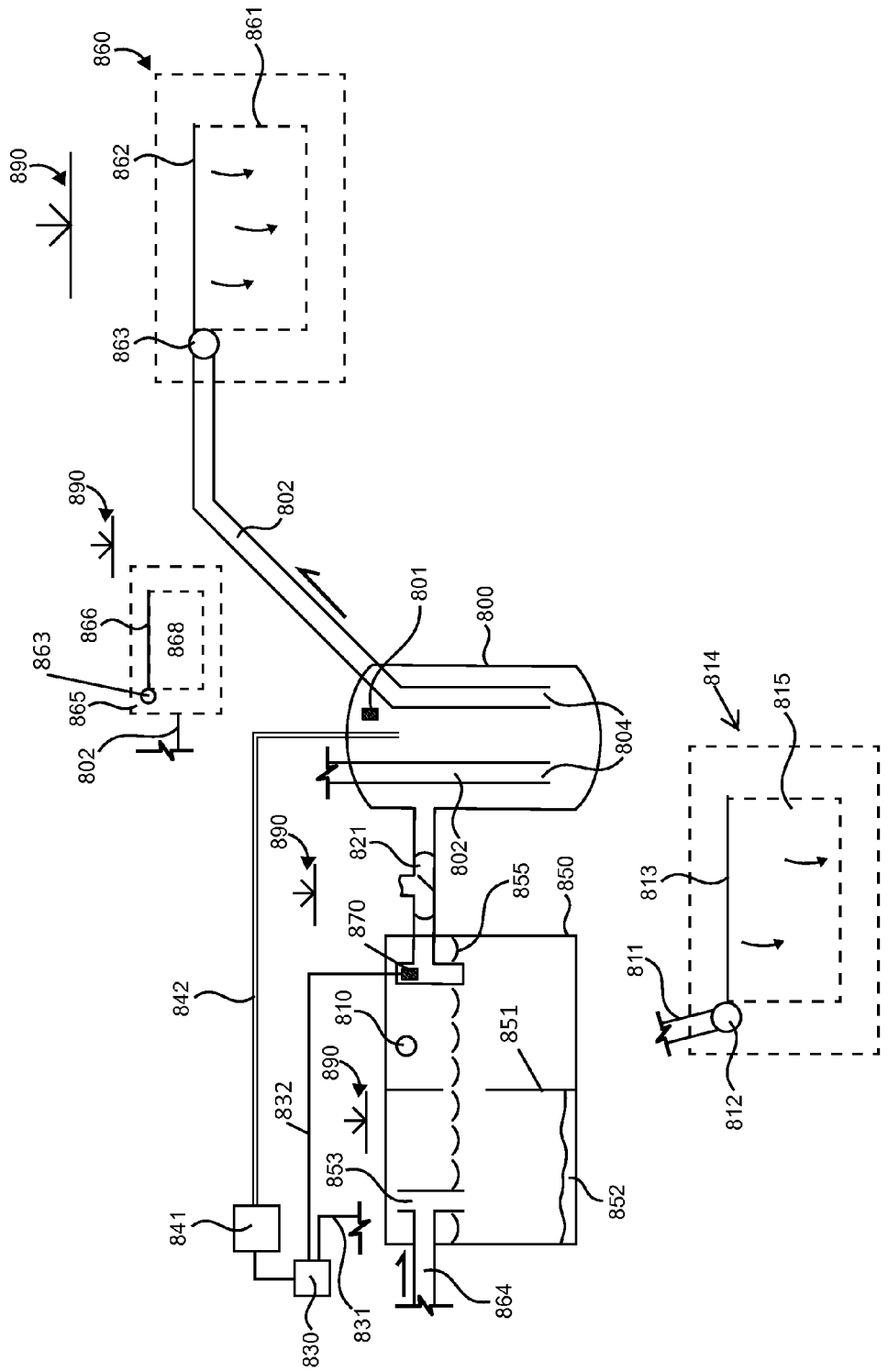
FIG. 8 is a perspective side view of a pressure vessel and various upstream and downstream components as may be employed in embodiments.

FIG. 8 is a perspective side view of a pressure vessel and various upstream and downstream components as may be employed individually or cumulatively in embodiments. Visible in FIG. 8 is the surface 890, a compressor 841 positioned above the surface, a compressor line 842 shown above and below the surface 890, a controller 830 coupled to controller lines 831 and 832, a septic tank 850 having an inlet 864, baffles 851, a t-inlet 853, an overflow outlet 810, an overflow detector 870, a septic tank 850, sludge 852 in the septic tank, a water level 855 in the septic tank, a check valve 821 between the septic tank 850 and the pressure vessel 800, a sensor 801 and discharge line inlets 804 in the septic tank. These discharge lines 802 may be connected to leach fields for water and gas treatment 860 and 865 respectively. These leach fields 860 and 865 may themselves include distribution channel(s) 863, drip lines 862 and 866, treatment media 861 and 868. They may be configured in different manners as well. For example, submerged pit systems may be also be used. As shown in FIG. 8 both leach fields may be at an invert elevation above the discharge line inlet invert elevation as well as above the pressure vessel and septic tank. In embodiments, the invert elevations of these various elements may be different than depicted in FIG. 8. For example one of the leach fields 865 and 860 may be above the pressure vessel while the other is not or is at the same invert elevation.

Also shown in FIG. 8 is overflow leach field 814. This overflow leach field may be fluidly connected to the overflow port 810 such that fluid reaching a certain level in the septic tank may flow to the leach field 814. This leach field may be constructed in the same manner as the other shown leach fields and may be configured in different manners as well. The overflow leach field 814 is shown with drip lines 813, treatment media 815, discharge line 811, and distribution channel (s) 812.

In use, as fluid accumulates in the pressure vessel 800 the overflow detector 870 may signal a full condition to the controller 830 which may signal the compressor with auxiliary reservoir 841 to develop pressure in the vessel 800. This pressure will preferably increase until reaching a target level and will force water in the vessel up the discharge line inlets 804, down the discharge lines 802 and into the leach fields 860 and 865. In embodiments the leach fields 860 and 865 may be ten foot or more higher closer to the surface or in elevation than the elevation of the discharge line inlets 804.

In some embodiments the leach fields may be "rotated" meaning that one will be accessible while the other may lay fallow and this alternating use may change over time. In embodiments, the compressor may run for a period of time after pushing fluid from the vessel such that air or other gas also flows into the discharge line inlets 804, down the discharge lines 802 and into the leach fields 860 and 865. This gas may provide rejuvenative effects to these components and their surroundings.

Should the overflow detector 870 malfunction or should surges in fluid levels in the tank inundate the pressure vessel an overflow tank or system may be employed in embodiments. In FIG. 8 this overflow is shown as an overflow leach field 814. The overflow leach field may be sized to have the capacity of the other leach fields as well as both larger and smaller capacities. As shown in FIG. 8 the invert elevation of this overflow protection 814 is lower than the invert elevation of the overflow port 810. The lower elevation is preferred such that in no power situations gravity feeding of fluid can be sustained to retard risks of overflow and backflow from the septic tank 850. To further decrease the risk of backflow from the septic tank a trap or check valve may be placed upstream of the tank in the inlet 854.

In embodiments, as noted above, treatment may be used for improvement of the treatment medium/system interface. This rejuvenation may include reducing clogging and reducing or removing biomass not only in the treatment medium but the interface between the treatment medium and the leaching pipe or conduit. Also, in embodiments, the use of internal items, such as diaphragms, bell devices, moveable seals, and springs, may be minimized or avoided completely to prolong maintenance intervals and improve reliability of systems.

Still further, in embodiments, as additional failsafe backup measures, a pressurized reservoir may also be used to store and hold pressurized gas for a period time and in the event of compressor failure or high system flow or for other reasons as well. This pressurized reservoir may also be used to increase the speed in which the pressurized vessel is pressurized. In other words, if a compressor is able to pressurize a pressure vessel in two minutes the use of an auxiliary reservoir can decrease this time. It may be advantageous to have shorter purging cycle times for pressurized vessel during high flow rates from the septic tank 850. In the event of compressor downtime, including malfunction and power loss, the amount of pressurized gas stored in reservoir may allow for several purge cycles of the pressure vessel to take place. For example, the reservoir may store enough compressed gas to allow for four additional purges of 45 seconds or more. In embodiments, the reservoir may include a high pressure, compressed gas/air, or supply tank and may even be portable to allow for refilling offsite to keep the pump system operating through an extended power failure or blower breakdown.

Accordingly, embodiments may also include systems, methods and devices for pressure distributing liquids, such as storm water, pretreated wastewater, or wastewater, into downstream infiltration and/or treatment systems. Embodiments may include wastewater infiltrations systems as well as aerating wastewater infiltration systems (collectively "WI systems"). Embodiments may also include the introduction of air or another gas into soil or other media surrounding a downstream infiltration field into which the water may flow. The introduction of air or another gas into the system may serve to enhance the hydraulic capacity and treatment efficiency of embodiments, including WI system embodiments.

Thus, in embodiments, gas may be discharged through the system and into one or more downstream infiltration fields in addition to being used to pump or lift water stored in a pressure vessel. The distribution to the one or more downstream fields may be controlled with or activated by one or more valves positioned to divert fluid. In so doing, the one or more downstream infiltration systems may be rejuvenated when active gases are used, such as gasses containing oxygen. This rejuvenation may be promoted by the active gas, which can serve to promote biochemical reactions in and around the infiltration field as well as rejuvenate other portions of the infiltration system. The active gas, which may include oxygen, may also serve to reduce biosolids in the system, including at the infiltration field, and at other locations as well. Thus, in embodiments, an active gas may be used to move water out of a pressure vessel and towards an infiltration system. This active gas may also act on the infiltration system and provide rejuvenative effects on and around the infiltration system. These rejuvenative effects may include rejuvenating a soil/system interface, treatment of organic accumulations, reduction in sludge or other biomass, and there beneficial effects in or around the system.

Embodiments may also include use on sand and other media filters for lifting up to, dosing and the benefits of gas flow through the media. And embodiments may include or rely on pumps to move or lift wastewater or other fluid to more optimum locations/elevations, and devices or systems to apply pressure and distribute wastewater or other water out for enhanced treatment in a treatment system. Furthermore, embodiments can be utilized with, or may include, numerous types of water treatment systems including, but not limited to, residential, commercial, industrial, and storm water, as well as other water treatment systems receptive to or requiring air or another gas for treatment. And, embodiments may be configured to be applied in septic tank wastewater systems as well as other types of organic or nonorganic treatment or pretreatment systems.

Embodiments may include systems that provide for lifting or pressurizing water in piping systems, and subsequently aerating components of the downstream treatment system or the downstream treatment system as a whole. Embodiments may employ supplemental or additional submersible or centrifugal pump(s) and an air mover at various stages in addition to the pressurized system for lifting the water. These supplemental or additional pumps or air movers may be used in downstream or upstream applications and for water treatment or water movement or both. When the required lift is in excess of the capability of the vessel and gas pressure generating device, additional vessels and gas pressure generating devices can be installed at higher elevations to serve as lift stations.

Embodiments may be configured to reduce, minimize or eliminate bubbling (entraining water in air to displace water upwardly) and to promote a uniform head in order to apply a relatively uniform pressure distribution across water or other fluid in a vessel to be lifted. Embodiments may employ an alternating flow of wastewater or other fluid and gas that may be necessary for optimum rejuvenation of the water or the infiltration systems or both. Embodiments may be further configured to reduce the likelihood that aeration of the infiltration system or water will occur at undesired times. In other words, while aerating wastewater or other fluid or an infiltration system may be considered to be desirable, bubbling oxygen containing gases through water can increase the production of sludge/biosolids. This can also negatively affect nitrogen removal. Thus, the pressure may be dropped considerably such that gas does not bubble into the water but, may still be used for rejuvenation. In preferred embodiments bubbling will be minimized, if not eliminated. Entrained bubbles to displace water are avoided, if not eliminated, in preferred embodiments. Thus, in embodiments, aeration may be controlled by regulating the gas pressure placed on the water in the pressure vessel and by changing the pressure as water is purged from the pressure vessel and gas begins to flow out of the pressure vessel. In embodiments, should aeration not be preferred, gas pressure may be reduced once gas reaches a discharge inlet in the pressure vessel such that the likelihood of gas transfer to the flowing water out of the pressure vessel and downstream is reduced. Embodiments, therefore, may balance these positive and detrimental effects of aeration through gas flow and water flow management, the timing of each, the amount of gas pressure used, the location of the inlet and outlet openings, and by using other techniques or configurations as well. Embodiments where the reactive gas is introduced into the top of the vessel, above the fluid, prevent air bubbles from moving through the fluid. This serves to minimize the production of sludge/biosolids.

Embodiments may include a pressurized dosing vessel with a check valve, actuated valve or other isolation device, such as a J-Trap, or other configuration that allows wastewater to flow into the pressure vessel containing the water when the water is not under significant pressure. These isolation devices can be inside or outside of the pressure vessel, and in embodiments this inlet can be fitted with effluent filters to filter water to any desired level of filtration. The valves may be in other locations as well.

Still further, a blower or other gas pressure generating device may be in fluid communication with the pressure vessel to create or supplement elevated pressure in the pressure vessel. In embodiments, the pressure developed in the pressure vessel may be capable of lifting the water wastewater or other fluid to a desired elevation and/or location. The pressures developed may serve to direct the gases and water downstream to a permeable media infiltration and off gas treatment system. Pressures involved may range and can include pressures between less than 1 psi to over 50 psi or more, where some systems may work at relatively low pressure of 1 psi or less and many systems may operate at 10 psi or less. Other pressures may also be used depending upon the density of the water, the distance it needs to travel and/or be lifted. A water or other fluid discharge line having a discharge inlet may run from near the bottom of the pressure vessel to the discharge point of the water into any downstream system.

Embodiments may also employ lines with multiple discharge orifices that may serve to more uniformly spread the dose of wastewater to a WI or other target. In other words, multiple discharge lines may be used to manage the downstream delivery of the water once it has left the pressure vessel or storage device. One or more of these lines may also serve as a vent needed to allow water or another fluid to enter the pressure vessel should the pressure generating equipment be sealed. In other words, one or more discharge lines may provide for venting of gases displaced by inflowing water or other configuration requiring gas venting—pressure balancing—to promote functionality. For example, with a linear diaphragm blower, displaced gases may not escape to atmosphere, so a vent with suitable valving or gas trapping devices may be employed in embodiments. Displaced gases are preferably reduced when the gases are odorous or otherwise unwanted to be discharged. Moreover, this discharge in embodiments may be made to sand filters or leach fields or the like that are downstream of a pressure vessel in order to manage odors of the wastewater and its off gasses.

In embodiments, a blower may be energized manually, by a time controller, or by signal input from a pressure transducer, float switch or other signaling device. Other triggering systems and methodologies may be used as well. In embodiments, a check valve may be utilized as the inlet sealing/isolation device. In embodiments, no signal may be required to close the inlet valve as this may be done manually by the valve configuration itself. In embodiments, an actuated valve or other similar isolation device may also be used. A signal may be sent by a controller or other device to close the valve in order to pressurize the pressure vessel.

In use, in embodiments, when the air blower is turned on, it should, preferably, pressurize the pressure vessel, and this pressure can serve to displace the water up a discharge line and to the downstream infiltration system under sufficient pressures. In embodiments a blower or pump may be utilized for pumping air or another gas and water or another water to a gravity distribution box or the like; in applications the blower or pump may be configured to send gas and water to: a pressure distribution system with small orifices (Low-Pressure Pipe "LPP"); a drip irrigation tube; or other similar devices functioning or configured to apply, sometimes uniformly, water or other effluent.

Embodiments may discharge to a gravity pipe, plastic infiltration chamber, etc. Preferably, the discharge point may be configured to be sufficiently vented to allow for gases, displaced by wastewater or other waters entering the pressure vessel to dissipate, without significant back pressure. A float or other level sensor can serve as an alarm signal generator to indicate a high level condition. In some embodiments, the level float switch can also be utilized as an alarm indicator, for example if the switch stays in the up position for too long an interval, an alarm signal and related alarm may be sent.

In embodiments, the pressure vessel can sit outside a septic tank, treatment tank, etc., or it can be installed directly into the tank. A benefit of installing it in an existing tank or a conventional treatment system device, such as a septic tank, may be lower cost or reduced space demands. Additionally, the main septic tank may remain anaerobic and/or anoxic during operation since the flow of air or other gas may be contained entirely within the smaller pressure vessel.

When a pressure vessel is positioned within soil subject to saturation, another vessel, tank, or other chamber, design considerations may include buoyancy considerations and the buoyancy forces associated with empty and filled vessels. Straps or other hold down devices may be used to secure the pressure vessel. Sheer mass may be used as well. Still further, in some embodiments the pressure vessel and the conventional tank may be precast or otherwise configured in the same component of an overall treatment system.

When a pressure vessel is installed either inside or downstream of another tank, wastewater or other water that is being generated in a house or other generating facility, during pressurization of the pressure vessel to forward flow a dose, can simultaneously accumulate in the other tank until the pressure vessel pressure drops down again, allowing inflow of effluent into the pressure vessel. In other words, when the pressure vessel is full or being discharged or not capable of accepting additional inflow of water, an outer tank or parallel tank or other tank may serve as a buffer or overflow tank upstream of the pressure vessel. In certain embodiments, a buffer or upstream tank can be eliminated and effluent can accumulate in the piping, leading between the wastewater source and the pressure vessel. In this embodiment, the piping serves as both a reservoir and a conveyance system. In embodiments where backpressures are low, water may be able to flow into the pressure vessel as water is being pressurized out of the pressure vessel.

In embodiments, when the pressure vessel is under pressure, higher internal pressures can serve to prevent waters at a lower pressure from entering it. When the dose has been pushed out of the pressure vessel, the pressure generating device may be deactivated and the pressure vessel pressure may drop to approximately atmospheric pressure, allowing water or another fluid to again flow into the pressure vessel.

Embodiments can also operate in conjunction with or as a backup for a traditional electrical pumping system. In other words, water to be purged from a sump or other storage source may flow into the pressure vessel and be evacuated by the gas pressure lifting as well.

Embodiments can be configured to receive water from a centrifugal, submersible or other pump device. This configuration allows for the use as a lift station or for the benefits of cycling the flow of water and air or other gas. Still further, embodiments can function off of a compressed air or oxygen supply. If the gas supply is in bottled form, it may be particularly beneficial when a power supply is interrupted. In preferred embodiments, the received water will have been pretreated before receipt by the pressure vessel.

In certain embodiments, such as when utilized with an aerobic pretreatment system and the like, the blower and associated piping can be configured to supply air or gas for tank treatment process and to discharge water or another fluid to the desired location and/or elevation. This eliminates the need for a blower and pump. Since the same blower is used for supplying air to the aerobic treatment device and for forward flowing water; this ensures that the aeration blower was operational and supplying air for treatment, before the water can be forward flowed for discharge. Controllers can also be utilized for sensing and logic to prevent untreated water from being forward flowed or discharged; however this is a simple fail safe method even without incorporating a controller. This configuration can be facilitated through the use of actuated valves and the like. In certain instances one blower may be dedicated to the treatment process and one may be utilized for the movement of water and gas to the infiltration system. In certain embodiments, dual alternating blowers are utilized for redundancy.

In embodiments the wastewater may be septic wastewater, pretreated wastewater, partially treated wastewater, as well as nonseptic, industrial, commercial or residential wastewater. In embodiments, the water may be discharged as effluent to local infiltration systems or other local facilities. The effluent may also be discharged to municipal sewer systems for more remote handling or for subsequent treatment.

In embodiments, a bubbler or agitator device such as 112 shown in FIG. 1, may be used in the system to fluidize sludge resident in the storage vessel or otherwise in the system. Also, filters may be employed to reduce sludge build up in the system or to pretreat water prior to system entry. Pipe sizes involved in the system including the inlet and outlets to the tanks and other components and blowers, as well as the leaching field may be in the range of one-half inch to six inches or more. The inlet or entrance to the pressure vessel may preferably be 1 to 6 or more inches and the discharge pipe from the pressure vessel may preferably be approximately one to four or more inches. Other sizes may be used as well.

Pressure vessels can be installed in a variety of orientations, including vertical, horizontal or any other angle. The desired orientation depends on vessel dimensions, depth to groundwater, gas pressure generator capacities, space constraints and other sizing considerations wherein elevation discharge points and leaching field elevations are accounted for and may be set to provide a slope of 0.25/foot or more, to satisfy anticipated volume throughput, and to satisfy local septic regulations. Shorter, larger diameter vessels are desirable in that they minimize the pressure requirements of the gas pressure generating device since the lift is minimized. Filters employed by the pressure vessel intake or other components of embodiments may include septic tank effluent filters made by Poly-Lock and Zabel.

Controllers used in embodiments may receive signals or instructions from floats, switches and sensors, and operators or users, and may use these signals or instructions to control the cycling of the gas flow and the pressure developed in the pressure vessel. The signals may indicate BOD levels, pressure, water levels, temperature, alarm conditions, doses, cycles, valve positions, float positions, oxygen levels, soluble or insoluble effluent constituents, and other monitored conditions as well. The cycle times may be variable based on the wastewater constituents or the amount of oxygen in the gas, where in some embodiments the less oxygen in the gas the longer the pump cycles, and in some embodiments the more organics in the wastewater the longer the pump cycles. Thus, oxygen content and organic content may be sensed and reported to the controller. The controller may make operational determinations based on signals received from sensors or other signal generating devices. The controller may also be governed by instructions received from an operator or user. The controller can track volumes of water forward flowed and deliver sufficient air, oxygen or other reactive gas to facilitate the treatment process. During intervals of high wastewater flow, multiple doses of water may be forward flowed without sufficient air, oxygen or other reactive gas flow; in this instance, the controller can track and make up for insufficient air oxygen or other reactive gas flow by extending run times after the high flow interval has passed.

The controller may be further configured or modified by a user to control cycle length based on water height and on water flow rate into the pressure vessel. For example, when water flow rate is high, the controller may not promote pressure and water buildup, but may, instead, promotes greater water flow through the pressure vessel and towards the downstream water treatment systems. Still further, the controller may send an alarm when water level in the pressure vessel is over a target height. The cycle time set by the controller may be such that the biological oxygen demand for the wastewater effluent is met for the water by the gas being pumped.

In embodiments, the sensors being employed could include mechanical sensors as well as voltage sensors and pressure sensors. In embodiments, the controllers may be configured to received stored code and execute the code to perform some or all of the steps and comparisons described herein. These may be performed in various orders and with more or less features and aspects as those described in the embodiments herein.

In embodiments, the blower may be run to provide a sufficient biological oxygen demand for the dose of fluid leaving the vessel. The amount of oxygen designed to be introduced per each dose from the pressure vessel may be set to levels sufficient for discharge into rivers or other local waterways. A float in the pressure vessel may serve as an alarm if internal volumes of fluid in the vessel are too high or if an insufficient amount of doses have occurred in an hour or other defined time period. The clean out of the vessel may also be used to override the vessel and to pump or otherwise direct wastewater or other fluid directly to the downstream treatment system. Thereby, bypassing the pressure vessel and the air dosing performed therein. The bubbler in the vessel may be used to treat or fluidize any sludge that may gather at the bottom of the vessel.

Embodiments may preferably seek to minimize or eliminate the bubbling of gases into the effluent upstream or downstream in system embodiments. In other words, embodiments may preferably seek to reduce bubbling or entraining gas into water in order to reduce or minimize or eliminate gas entrainment that promotes the creation of biosolids or sludge or other biomass. Bubbling may, however be used for mechanical agitations, such as dislodging sludge from the tank. In preferred embodiments, the gas pressure placed atop fluids in the pressure vessel will push down on the fluid rather than bubble through the fluid. Since the vessel operates at a supra atmospheric pressure, oxygen transfer into the fluid is enhanced. In certain embodiments, the vessel is pressurized with gas and the pressure maintained for a period of time, to enhance oxygen transfer into the fluid, prior to forward flowing the fluid.

As wastewater or other fluid may have organic components and nonorganic components, aerobic activity may be promoted by the gas in some embodiments, such as when using gasses with oxygen. In embodiments, aerobic activity may not be promoted by the gas, such as when the gas being used has little or no oxygen.

Embodiments may also be configured to prevent siphoning that is common when a pump tank is located at an elevation higher than the discharge point(s) and may serve to minimize freezing of pipes by pushing the water out of the piping and subsequently flowing of air to drain piping of a treatment system.

Due to the corrosive nature of many wastewaters, the pressure vessels are preferably constructed of fiberglass, plastic, stainless steel and other strong, corrosion resistant, materials. Embodiments may also reduce or eliminate duplication of pumps and blowers in the same or connected wastewater or contaminated fluid treatment systems. In embodiments, a single blower may perform the functions of blowers and pumps, and in some embodiments a single blower may be sufficient for the system. Additionally, slime that is typically present in wastewater or contaminated fluid piping and/or associated orifices may be minimized by flowing air after dosing wastewater or other contaminated fluid. The air dose or other reactive gas dose may serve to dry down the pipe, supply oxygen, or push solids and liquids out of the piping system. Each may serve to beneficially minimize organic and inorganic accumulations in wastewater or other contaminated fluid piping systems. Embodiments may also minimize the need to put electrical components in corrosive environments associated with the treatment systems.

In certain embodiments, dual pressure generating devices may be used, for redundancy and backup in single failure circumstances. During high flow intervals both devices can also be utilized simultaneously.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof.

Embodiments may be implemented as a computer process, a computing system or as an article of manufacture such as a computer program product of computer readable media. The computer program product may be a computer storage medium readable by a computer system and encoding a computer program instructions for executing a computer process.

The corresponding structures, material, acts, and equivalents of all means or steps plus function elements in the claims are intended to include any structure, material or act for performing the function in combination with other claimed elements as specifically claimed. The description of the embodiments of the present invention has been presented for purposes of illustration and description, but is not intended to be exhaustive or limited to the invention in the form disclosed. Many modifications and variations will be apparent to those of ordinary skill without departing from the scope and spirit of the invention. The embodiments were chosen and described in order to best explain the principles of the invention, and the practical application, and to enable others of ordinary skill in the art to understand the invention for embodiments with various modifications as are suited to the particular use contemplated.

What is claimed is:

1. A wastewater treatment system comprising:
   a pressure vessel having a liquid input, the liquid input configured to be in fluid communication with a pretreatment device, the pretreatment device comprising one or more of a filter, treatment tank or a settlement chamber;
   an inlet flow regulator positioned for regulating gas pressure in the pressure vessel;
   a gas supply port configured for routing gas used for increasing gas pressure within the pressure vessel;
   a pressure vessel discharge conduit for flowing fluid from within the pressure vessel to a downstream system for treating liquid or treating off gas or both;
   wherein the discharge conduit is configured to flow liquid and then flow gas not entrained in the liquid from the pressure vessel after gas pressure above the liquid in the pressure vessel exceeds a discharge threshold to flow the liquid out of the pressure vessel via the discharge conduit and then flow gas not entrained in the liquid out of the pressure vessel via the discharge conduit.

2. The wastewater treatment system of claim 1 further comprising a controller, the controller configured to permit or prevent the flow of pressurized air from the compressed gas source upon receiving signals from one or more sensors that each of the following threshold targets has been met: a target pH level has been met; a target temperature, has been met; a target pressure has been met, a target BOD level has been met; a target oxygen level has been met; and a target supply voltage has been met.

3. The wastewater treatment system of claim 1 further comprising:

a filter positioned to filter liquid entering the pressure vessel and comprising a sensor and a filter signal line, the filter signal line in communication with a controller.

4. The wastewater treatment system of claim 1 further comprising:
a controller, the controller configured to receive signals from sensors that detect the ambient pressure in the pressure vessel, the controller configured to activate and stop a source of compressed gas supplying gas to the gas supply port when target pressure is reached or when a target time period has passed, or when a target volume of wastewater has accumulated in the pressure vessel.

5. The wastewater treatment system of claim 4 wherein the controller is an electronic device and is further configured to operate one or more valves of the wastewater treatment system, the one or more valves remaining open or being closed because of signals sent by the controller, the signals being sent by the controller when pressure in the pressure vessel reaches a target value or a target accumulated volume or a target BOD level or a target oxygen level.

6. The wastewater treatment system of claim 4 wherein the controller is further configured to activate and stop a source of compressed gas to purge wastewater from the pressure vessel and to send compressed gas downstream of the pressure vessel and into the downstream treatment system, the controller further configured to continue sending compressed gas for a period of time sufficient to promote aerobic conditions at and rejuvenation of leaching media surrounding an infiltration system of the downstream treatment system.

7. The wastewater treatment system of claim 1
wherein the pretreatment device comprises a septic tank in fluid communication with the liquid input of the pressure vessel, and
wherein the downstream treatment system comprises an infiltration system for treating water or off gas or both.

8. A fluid distribution system comprising:
a pressure vessel having one or more discharge conduits;
a valve in fluid communication with a wastewater fluid inlet of the pressure vessel; and
a gas pressurization supply in fluid communication with the pressure vessel;
wherein the pressure vessel is configured such that pretreated wastewater accumulates in the pressure vessel and gas in the pressure vessel is pressurized above the surface of the accumulated wastewater by the introduction of gas from the gas pressurization supply into the pressure vessel and,
wherein the pressure vessel is configured such that the pretreated wastewater is cyclically purged from the pressure vessel and flows towards an infiltration system by gas compressed by the gas pressurization supply and held under pressure within the pressure vessel,
wherein the pressure vessel is configured such that the cyclical purging occurs through one or more discharge conduits of the pressure vessel and such that wherein nonentrained gas flows through a discharge conduit immediately after wastewater is pushed from the pressure vessel through the same discharge conduit.

9. The fluid distribution system of claim 8 further comprising at least one or more of the following:
an infiltration system in fluid communication with a discharge conduit and at least partially above the elevation of the exit of the pressure vessel;
a wastewater distribution box;
a gravity pipe;
an infiltration chamber;
an auxiliary compressed gas reservoir; or
an overflow leach field in fluid communication with a treatment tank, the treatment tank in fluid communication with the pressure vessel and serving as a source of pretreated wastewater for the pressure vessel; and
wherein the cyclical purging from the pressure vessel serves to vent gas from the pressure vessel,
wherein the valve is a passive one-way valve or is an active controlled valve, and
wherein the gas pressurization supply is a blower that is activated from a fluid level sensor or from a timer.

10. The fluid distribution system of claim 9 wherein the infiltration system includes a drip irrigation conduit.

11. The fluid distribution system of claim 8 wherein one or more of the discharge lines is in fluid communication with the infiltration system.

12. A method for aerating wastewater sent to a leaching field comprising:
flowing gas into a pressure vessel, the pressure vessel having an exit port and an entrance port, the gas being pressurized atop wastewater in the pressure vessel;
discharging wastewater in the pressure vessel and then discharging gas in the pressure vessel towards a leach field by pushing the wastewater from the pressure vessel via the exit port with pressurized gas in the pressure vessel and then by flowing gas in the pressure vessel out of the pressure vessel via the exit port as nonentrained gas; and
after discharging wastewater, stopping or reducing flow of gas into the pressure vessel for a period of time.

13. A pressure vessel system for accumulating and discharging fluid comprising:
a first device configured to develop gas pressure in a pressure vessel;
a valve or trap on an inlet of the pressure vessel that is configured to allow wastewater to enter the pressure vessel and inhibit gas flow out of the vessel when the first device is building gas pressure in the pressure vessel;
a second device configured to detect wastewater level in the pressure vessel; and
a conduit having an entrance port running from a bottom portion of the pressure vessel to a discharge point outside of the pressure vessel through which wastewater flows intermittently from within the pressure vessel to outside of the pressure vessel and through which nonentrained gas flows intermittently from within the pressure vessel to outside of the pressure vessel,
the conduit having rest periods during cycles of filing and emptying where nonentrained gas or wastewater is not being forced out of the pressure vessel;
wherein the pressure vessel is located downstream of and receives wastewater from a third device, the third device for treating wastewater.

14. The pressure vessel system of claim 13
wherein the gas is air;
wherein the first device is a compressor or blower;
wherein the second device is a sensor;
wherein the third device is a septic tank or clarifier;
wherein there is a filter downstream of the third device; and
wherein the conduit discharges to a soil infiltration system for gas and water.

15. The pressure vessel system of claim 14 further comprising:
a controller configured to track wastewater flow and optimize gas flow into and out of the vessel using the tracked wastewater flow.

16. The pressure vessel system of claim 14 wherein there are two first devices that alternate operation.

17. The pressure vessel system of claim 13 wherein the first device is also used to aerate the third device.

18. The pressure vessel system of claim 13 wherein when the conduit is filled with gas internal surfaces of the conduit are being dried.

19. The pressure vessel system of claim 13 wherein the first device is a blower or compressor that is configured to be turned on and off by a timer.

20. The pressure vessel system of claim 13 further comprising:
   a vent, trap or valve on the pressure vessel that is configured to allow pressure levels within the pressure vessel to drop after wastewater or gas or both is discharged from the pressure vessel.

* * * * *